United States Patent [19]

Knoess

[11] Patent Number: 4,951,798
[45] Date of Patent: Aug. 28, 1990

[54] POROUS SINTERED METAL AND NONPOROUS FRICTION MATERIAL FOR CLUTCHES

[75] Inventor: Walter Knoess, Fussen, Fed. Rep. of Germany

[73] Assignee: Sinterstahl Gesellschaft m.b.H., Fussen, Fed. Rep. of Germany

[21] Appl. No.: 315,338

[22] Filed: Feb. 24, 1989

[30] Foreign Application Priority Data

Mar. 3, 1988 [DE] Fed. Rep. of Germany ....... 3806828

[51] Int. Cl.$^5$ ............................................. F16D 13/74
[52] U.S. Cl. .............................. 192/107 M; 192/53 F
[58] Field of Search ............... 192/53 R, 53 F, 107 M

[56] References Cited

U.S. PATENT DOCUMENTS

| 2,299,877 | 10/1942 | Calkins | 419/28 |
| 2,319,740 | 5/1943 | Lapsley et al. | 192/53 E |
| 3,578,122 | 5/1971 | Magnier | 192/53 F |
| 4,618,049 | 10/1986 | Pflaüm et al. | 192/107 M |
| 4,770,283 | 9/1988 | Mütz et al. | 192/53 F |

FOREIGN PATENT DOCUMENTS

| 1196444 | 7/1965 | Fed. Rep. of Germany . | |
| 2055345 | 5/1972 | Fed. Rep. of Germany ... | 192/107 M |
| 2744994 | 4/1979 | Fed. Rep. of Germany . | |
| 3122522 | 12/1982 | Fed. Rep. of Germany . | |
| 3417813 | 6/1985 | Fed. Rep. of Germany .... | 192/53 F |
| 3515512 | 10/1986 | Fed. Rep. of Germany . | |
| 3637386 | 9/1987 | Fed. Rep. of Germany . | |
| 3724000 | 5/1988 | Fed. Rep. of Germany . | |
| 81535 | 11/1969 | German Democratic Rep. . | |
| 57-107437 | 7/1982 | Japan | 192/107 M |
| 945445 | 1/1964 | United Kingdom | 192/53 F |

OTHER PUBLICATIONS

M. Drozda: "Eigenschaften Und Anwendung von Sinterreibwerkstoffen", Antriebstechnik 22 (1983), No. 6, pp. 35-37.

Primary Examiner—Leslie A. Braun
Assistant Examiner—Nicholas Whitelaw
Attorney, Agent, or Firm—Morgan & Finnegan

[57] ABSTRACT

An automotive transmission lubricated friction clutch is provided having a synchronization ring and matching cone; these parts form a friction pairing. Materials having different friction characteristics and friction wear resistances are used for the friction surfaces forming the friction pairing. A specific friction material is provided having desirable friction characteristics but lacking pores or drainage thread for one friction surface, and a microporous sintered material having a friction-effective area A of 50% <A <90% of the total friction surface and pores with a mean diameter of <300 μm for the other friction surface. Either the synchronization ring or the matching cone are designed to represent one or the other form of friction surface, as desired. Lubricated friction clutches for automotive transmissions can be manufactured according to the invention that have increased life expectancy, shorter shifting times, smaller sizes and reduced manufacturing costs as compared to other clutches.

14 Claims, 1 Drawing Sheet

POROUS SINTERED METAL AND NONPOROUS FRICTION MATERIAL FOR CLUTCHES

FIELD OF THE INVENTION

The present invention relates to an improved lubricated friction clutch having a synchronization ring and matching cone. The invention is suitable for use in automotive transmissions. The clutch elements are made from different materials which form a friction pairing, wherein one of the friction surfaces of the friction pairing is a specific friction material having certain friction properties, and the other surface can be any material commonly used for machine parts, preferably steel.

BACKGROUND OF THE INVENTION

In recent years it has become increasingly necessary to design transmissions, especially manual automotive transmissions, able to transfer both increased drive and synchronization power while at the same time reducing both transmission and transmission parts' sizes (see "Improved materials for synchronization rings", K. H. Matucha et al., Automobiltechnische Zeitschrift 83,5 (1981), p. 227–230). As a consequence, transmission synchronization rings were designed with increasingly intricate shapes and small friction surface areas. The other member of the friction pairing, typically a friction cone, developed in the same manner. The friction power achievable per unit of surface area was also increased by the use of improved materials and surface structures and by reducing the dimensional tolerances. Both these changes improved the contact relationship between the two opposing friction surfaces (e.g. DE 25 38 882, DE 30 33 139, DE-PS 27 44 994, DE-GM 73 42 680).

Besides the need to reduce transmission size, there is also a demand to make shifting more comfortable while shortening shifting times. This requires the transmission be able to transfer more frictional work per unit of clutch surface area. However, as the amount of frictional work transfer increases, more friction heat will be produced per unit of time and surface area, and this heat must be dissipated. Another complication is that as the friction pairing parts make friction contact more rapid, the transmission oil present between the opposing friction surfaces must be removed more quickly. The oil is usually evacuated through drainage grooves and/or threads present in the friction surface.

Brass synchronization rings or resin-impregnated paper liners currently used in synchronization rings in automobile shifting transmissions have now generally reached their performance limits, as well as steel synchronization rings having ground, flame or plasma spray molybdenum coatings or custom molybdenum coatings which are used in trucks.

Alternatively, automotive friction clutches use sintered friction linings that are distributed on a sheet which is attached to the friction surface of a synchronization ring, typically by welding. These embodiments have substantially improved the performance of automotive transmission friction clutches (DE-PS 34 17 813). However, in view of the demand to use increasingly intricate designs in the synchronization rings, attaching by welding prefabricated sheets having a coating of sprinkled and sintered powder material presents the drawback of reducing the ring thickness and consequently, also reducing the force on the basic ring needed to cause mechanical cracking. Practically, however, the ring's mechanical strength should be increased because increased power is to be transmitted. Moreover, such rings are relatively costly to manufacture.

A clutch having optimal performance and durability can be made by employing different materials for the individual elements of the friction pairing, each material having different frictional characteristics. Certain friction materials possess particularly favorable friction characteristics; namely, they can deliver a great deal of frictional work through frictional contact and they are highly wear-resistant. Various brass alloys, molybdenum coatings, and a multitude of sintered coatings of various material compositions have all proven especially effective when used as these specific frictional materials. The specific rate of coating wear of the friction surface, or its reciprocal value, (the wear resistance of the two frictional materials) is determined in order to measure a friction pairing's durability. Friction pairing durability is reduced when a very abrasive friction surface is matched with a relatively soft opposing surface. Total wear behavior is also compromised when there are two abrasive, equally hard friction surfaces wearing against each other. In view of those observations, friction pairings were designed wherein specific attention was paid only to one of the two friction surfaces (the synchronization ring) of the pairing. Different matching cones were manufactured, most from types of steel having high surface hardnesses. The friction surface of the synchronization ring was machined, or in some cases made by spray metal coating, to give it acceptable surface structure properties.

Other attempts to improve automotive shifting transmission clutches have involved making the friction surface of the synchronization ring from hardened steel and coating the friction surface of the matching cone with a layer of molybdenum. At the same time, however, it was considered necessary to provide the friction surface of the synchronization ring with drainage grooves and/or threads for carrying off the oil. Because of these grooves and/or threads no significant advantage was obtained as compared with the combination of a Mo-coated synchronization ring in conjunction with a smooth matching cone. In particular, the problem of reduced synchronization ring strength due to the use of drainage grooves persisted.

For reasons well known to those having ordinary skill in the art of automotive transmissions, friction clutches must be lubricated with oil during operation. Consequently, a number of measures have been proposed to maintain a lubricating film without creating hydrodynamic bearing pressure between the friction surfaces, while still assuring the best possible coupling is had between the two friction surfaces. Accordingly, patent DE 27 44 994 proposes impregnating a paper-based friction lining with a synthetic resin in such a manner that it acquires a rough, porous surface. The patent elsewhere states "it has proven especially advantageous that the friction lining be porous and elastic. Due to its porosity, the friction lining can, during the synchronization process, absorb the oil film on the friction surfaces which would otherwise be an impediment, and carry it off during the operating cycle." As a supplementary measure this patent teaches "it is effective to add axial grooves to the friction lining which serve to drain off the oil, and if the grooves have sharp edges, also to strip off the oil." However, when the elastic, compressible paper lining of this design is used, the pores are squeezed shut during the friction process.

Other references teach that oil displacement can be facilitated by roughening the friction surface. DE 28 34 840 suggests that point-shaped depressions should be made in the friction surface by means of spark erosion, creating a surface roughness $R_Z$ of 25–50 μm. This technique is used rather than that described previously, namely roughening the friction surface by spraying on metal coatings or by mechanically sandblasting, or by chasing a fine, circular thread which is capable of taking up oil when the two friction surfaces make contact, thereby conducting the oil toward the axial grooves. According to the patent specification cited, the "roughening of the cone surface serves the purpose of piercing the oil film and rapidly establishing frictional contact." If these surface roughening techniques are used, better friction coefficients can be had than when the surface is roughened with a sprayed-on molybdenum coating or when a fine thread is applied to the friction surface. This roughening technique has not found acceptance in actual practice, though. The long manufacturing cycle time alone make it impractical for mass-produced parts such as transmission clutches. Any improvements in frictional characteristics as compared to the processes now being used are insignificant.

OBJECTS OF THE INVENTION

Applicant has manufactured a friction pairing where one surface is made from a specific frictional material, preferably formed by sintering, and the other from ordinary machine steel. Applicant has discovered that by manufacturing the sintered specific frictional material so as to be substantially free of pores and the ordinary machine steel surface so as to be substantially porous, preferably by sintering, pairing performance is unexpectedly improved.

It is therefore an object of the invention described herein to provide a lubricated friction clutch, for use in transmissions.

It is another object of this invention to provide a synchronization ring and matching cone transmission clutch which offers friction characteristics (friction coefficients and frictional wear) at least as favorable as those of the friction clutches presently available.

Yet another object of the invention is to provide a transmission clutch that is economical to manufacture and has a long life expectancy.

Another object of the invention is to avoid weakening the synchronization ring as happens when drainage threads and grooves are applied, or when synchronization rings are manufactured with a sheet carrying a scattered sintered friction coating.

Another object of the invention is to utilize the greatest possible active surface area of the working friction surface.

SUMMARY OF THE INVENTION

The objective of the invention is achieved by means of a lubricated friction clutch in which the friction surface is made from a specific frictional material free of or having few pores and having no drainage thread. The opposing friction surface consists of a microporous frictional material which has a high hardness relative to the specific frictional material, and has an effective friction area A which is $50\% < A < 90\%$ of the theoretical total friction area, and contains pores with a mean diameter of $<300\mu m$.

The lubricated friction clutch of the present invention offers a number of important advantages over known designs. Until now it has either not been considered necessary, or it has been neglected, to improve friction clutches by carefully matching the design of each of the two friction parts of a pairing, applying certain design conditions to one of the friction parts and other conditions to the other one, depending on the most favorable conditions in each case.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations, steps and improvements herein shown and described.

It will be understood that the foregoing general description and the following detailed description as well are exemplary and explanatory of the invention but are not restrictive thereof.

DESCRIPTION OF THE INVENTION

Figure 1:
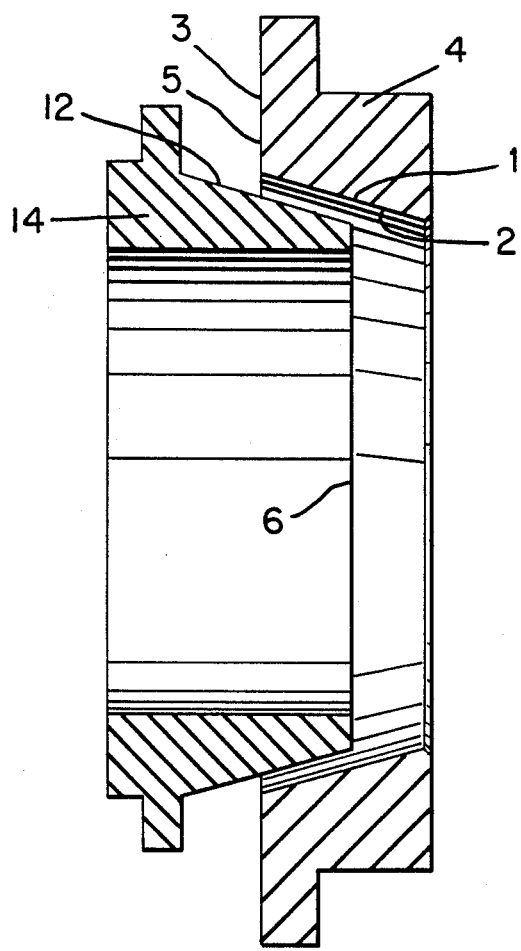
FIG. 1 depicts in cross-section a clutch constructed in accordance with the present invention.

According to the invention depicted in FIG. 1 and described below, it is proposed that a friction clutch for automotive transmission be designed where one of the two friction surfaces of the frictional pairing is made out of a specific frictional material, using the full geometric surface area of the part as an active frictional area, and the opposing surface of the frictional pairing is designed to be a sintered part having a porous surface. In this invention the sintered, porous friction surface can be located on either the synchronization ring or the matching cone.

FIG. 1 shows a friction pairing according to the present invention. Cone 14 has a conical outer surface 12 and synchronizer ring 4 has a conical inner surface 1. Conical surfaces 12 and 1 are shaped to fit together and engage one another. Thus, cone 14 and synchronizer ring 4 can be brought into or out of engagement by relative motion along their common center axis 6. The shapes of these parts are not themselves new.

In the case where the synchronization ring, or the friction surface area on the synchronization ring, is made of the specific frictional material, many materials can be selected which offer a satisfactory compromise between frictional characteristics and mechanical strength. There is no need to select a frictional material which has a high friction coefficient as possible.

In cases where previously a material was able to transfer a great deal of frictional work per unit of surface area, but because it lacked sufficient mechanical strength, was just barely able to deliver the synchronization power needed, a frictional material can now be used which has full surface area utilization and greater mechanical strength even though the material has less optimal specific frictional properties. The reasons for this are clear.

During the frictional clutching process, the specific frictional material of a pairing constructed in accordance with the present invention is in active frictional contact over nearly its entire theoretically available frictional surface, because the active frictional area (A) is not reduced by notches, grooves or pores. These surface features reduce the active frictional area of conventional pairings to 10-30% of the theoretical friction surface. This means that for a given value of synchronization power, the specific surface area loads and local heat buildup of the friction surface of a pairing in accordance with the present invention are both reduced. The relatively large active friction surface area helps to conduct the heat generated by friction, which would otherwise limit the maximum load and affect wear, into a large volume of material. Thus, by reducing the heat generated wear resistance requirements of the friction surface are relaxed and the clutch life expectancy is extended. Because drainage grooves and threads are not used, the available volume of the softer frictional material which wears away is increased two- or threefold as compared to the state of the art. Again, this increases clutch life expectancy and improves shifting comfort.

The opposing surface has a porous structure and it is designed as a microporous, hard sintered part. This structure facilitates the rapid displacement of oil between the engaging friction surfaces during the synchronization process because the oil, compressed between the specific frictional material, which as noted has no grooves or pores, and the microporous, sintered opposing surface, flows into the pores. This rapid removal of oil from between the two surfaces means there is no hydrodynamic pressure buildup between the friction surfaces which otherwise delays synchronization. If necessary, a few axial drainage grooves are added to the microporous friction surface. Because during the friction process the sintered, porous friction surface makes contact with the other friction pairing surface over only a relatively low active percentage ($50\% < A < 90\%$) of its surface area, these few grooves can be added to the microporous surface without reducing total frictional power which the clutch can transmit.

Those porous materials having good frictional properties now in use are comparatively soft; as a rule, their elastic compressibilities are high. Welded-in sheets having coatings of sprinkled and sintered friction materials also have high elasticities. Therefore, there are certain drawbacks to using such materials. Among these disadvantages are long shifting paths for the synchronization process and a reduced acceptable axial wear reserve due to the lack of room in the transmission. In comparison, a friction clutch designed according to the invention described herein does not require the use of high elasticity materials. Shifting paths and shifting times during synchronization in the automotive transmission are short. Material elasticity does not play an essential part in determining precision requirements or the wear reserve.

Those having ordinary skill in the art will appreciate that if the cone 14 is constructed from a specific frictional material then synchronizer ring 4 should be formed as the microporous, hard sintered part. Conversely, if the cone 14 is formed as the microporous, hard sintered part, the synchronizer ring 4 should be formed from the specific frictional material.

DETAILED DESCRIPTION OF THE PREFERRED EMBODIMENTS

Today's automotive transmission friction clutches are typically designed with synchronization rings having an inner cone and opposing shifting gear friction surfaces having an outer cone. However, designs are known, and can be implemented according to the present invention wherein either the synchronization ring has an outer cone and the shifting gear has an inner cone, or wherein the individual parts of the clutch have one friction surface formed as an outer cone and another, additional friction surface formed as an inner cone (double cone synchronization). The increased friction surface area offered by the latter design substantially increases the frictional power which can be transmitted.

Depending on the required design and dimensional characteristics of a friction clutch, it may be advantageous to either manufacture a clutch part as a single solid sintered part, or to mount the sintered portion which is the friction surface on a base part not made from sintered metal. Until now it has been important that sintered parts used as stress-bearing components in friction clutches be manufactured having the lowest porosity possible, uniform density, and as high a mechanical strength as possible. In contrast, the present invention uses known sintered-metal technology processes to manufacture a solid sintered part having the desired degree of porosity in the region of the friction surface. For example, a solid sintered part can be designed having a completely compact base area and a porous friction surface region simply by adding a pore-forming substance to the powdered-metal blank in the region of the friction surface, which substance evaporates during the sintering process (DE-PS 16 08 128). If the metal powder used for the sintered part has the appropriate form and size, an open-pored skeleton can be formed in the region of the friction surface; it is also possible to create individual pores, most of which are not interconnected, extending into the friction surface down to a depth of 0.5-2 mm. As a rule, the strength of this type of part is only slightly less than that of a homogeneously compacted sintered part.

The clutch part of a lubricated friction clutch automotive transmission which part's friction surface has a microporous structure is manufactured as a solid sintered part from sintered iron, sintered steel or from other metallic and/or non-metallic sintered materials. According to a preferred type of design, this part is dense and strong in a core region, and microporous and perhaps surface-hardened throughout a surface region limited to a thickness of just a few millimeters. Sintering technology not only permits the use of highly diverse base materials but also the homogeneous inclusion of metallic and non-metallic additives in order to modify the hardness, strength and frictional properties of sintered parts having microporous structures. Ceramic and/or hard-alloy additives have proven effective for modifying the hardness and/or wear characteristics of microporous sintered parts made of the materials already listed. Mineral additives such as graphite, $Mo_2S$, Pb stearate, and Mn sulfide can be used to modify the frictional properties of the sintered parts, as can pure metals such as lead, copper, zinc and tin. Finally, the completed sintered parts can be impregnated with synthetic materials which modify their frictional properties, but this requires the retention of a porous structure according to the present invention. Sintered parts made of steel, in particular, can be induction- or case-hardened in their surface regions.

Clutch elements which are designed as ring-shaped sintered parts and which are attached to massive base parts include both rigid, self-supporting structures and shrunk-on, sintered-on, rolled-on or welded-on sintered rings. Porous sintered layers can be formed on massive base parts in individual cases by spraying on an additional material layer which then undergoes thermal and/or mechanical post-treatment.

By rolling the porous sintered parts' friction surfaces the sintered material can be compacted, depending on the sintered part's hardness, down to a depth of 0.2–0.6 mm. This changes the pore structure by reducing the mean pore diameter in the surface region as compared to lower regions. This makes it possible to increase the friction-effective portion of the porous friction surface without reducing the porosity below that required for adequate oil drainage.

Another preferred embodiment of the present invention involves the inclusion of elliptical pores in the immediate surface region of the friction surface of the porous sintered part. Normally the pores in metallic sintered parts are nearly round. These elliptical pores are made by means of mechanical shaping techniques, such as pressing or rolling with the longer of the two axes of the elliptical pores lying at right angles to the direction of friction of the friction pairing.

Currently the technology for producing shaped, sintered metal parts can make parts which meet predetermined final dimensions even when very narrow tolerances are specified. Even so, when the present invention is used it will often be advantageous to grind the microporous surface sintered part after sintering and possibly to harden it to achieve the desired design dimensions. Sintered parts can be manufactured to an oversize of approximately 1/10 mm by means of the sintering process without any special added measures and can then be subsequently ground to the desired design dimension within a tolerance of about ±1/100 mm.

As already mentioned, it is especially advantageous to manufacture parts designed in accordance with the present invention to narrow grinding tolerances, since relatively non-elastic materials can be used for both the friction surfaces of a frictional pairing. The design friction value can be obtained without having to overcome any material elasticity range.

In accordance with the present invention, it is also possible to improve the performance brass synchronization rings so they can achieve much higher nominal friction power values per unit of surface area than was heretofore possible. These rings are still used today in automobile manufacture. Such brass synchronization rings do not require any surface roughening or addition of drainage grooves. The brass alloy composition to be used is selected mainly in view of the required strength of the gear rim of the synchronization ring; the friction coefficient of the selected brass alloy is not such as important factor. Synchronization rings made of brass are best be used with a matching cone made of sintered steel having a microporous, hardened and ground friction surface.

In yet another preferred embodiment of this invention, the synchronization ring consists of a sintered part which is porous in the region of the friction surface, while the friction surface of the matching cone is made of a smooth brass ring or hollow brass cone which is pressed, shrunk, rolled or forged onto the corresponding shifting or gear wheel stub. This embodiment allows manufacturers to hold close manufacturing tolerances and cold-harden the surface coverings. The use of brass will of course always be limited to the area of the matching cone because brass, being a material with good frictional properties, is unsuited for the other functional areas of a gear wheel due to the high amount of power to be transmitted in automotive applications.

The invention in its broader aspects is not limited to the specific embodiments herein shown and described but departures may be made therefrom within the scope of the accompanying claims, without departing from the principals of the invention and without sacrificing its chief advantages.

It will be understood that the foregoing general description and the following detailed description as well are exemplary and explanatory of the invention but are not restrictive thereof.

I claim:

1. A lubricated friction clutch for a transmission of the synchronization ring and matching cone type,
   comprising a first clutch part and a second clutch part that can controllably engage one another, forming a friction pairing, in which the first and second clutch parts are made from differing materials the first clutch part having a first friction surface and the second clutch part having a second friction surface, the first and second friction surfaces being opposed to one another, wherein the first friction surface is a specific frictional material having desirable frictional properties, and the second friction surface is made from an iron-based material of high mechanical strength, the first friction surface being substantially non-porous, and the opposing second friction surface is made from microporous sintered material that is considerably harder than the specific frictional material used in the first friction surface, the second friction surface having pores and being microporous, the second friction surface having a friction-effective area A of $50\% < A < 90\%$ of the portion of the geometrical area of the friction surface giving an effective contribution to friction and having pores with a mean diameter of less than 300 $\mu$m.

2. A lubricated friction clutch as in claim 1, wherein the first and second friction surfaces are conically-shaped.

3. A lubricated friction clutch according claim 1, wherein the second clutch part having the microporous opposing friction surface is a solid sintered part.

4. A lubricated friction clutch according to claim 3, wherein the second friction surface has axial drainage grooves.

5. A lubricated friction clutch according to claim 1, wherein the second clutch part supporting the microporous friction surface further comprises a porous sintered-metal ring attached to a solid base part.

6. A lubricated friction clutch according to claim 1, wherein the pores form an open conducting system suitable for draining oil away from the friction surface.

7. A lubricated friction clutch according to claim 1, wherein the pores in the second friction surface extend down to a depth of between 0.5 to 0.2 mm into the second friction surface and are only slightly interconnected.

8. A lubricated friction clutch according to claim 1, wherein the second friction material's means pore diameter in the surface region down to a depth of 0.2–0.6 mm is smaller than that of pores lying deeper in the material.

9. A lubricated friction clutch according to claim 1, wherein the pores on the second friction surface have a shape which is elliptical, with a longer ellipse axis disposed approximately at right angles to a direction of friction of the friction pairing.

10. A lubricated friction clutch according to claim 1, wherein the first clutch part made of a specific friction material is the synchronization ring, the first clutch part further comprising a non-porous brass ring having a smooth surface.

11. A lubricated friction clutch according to claim 1 wherein the first clutch part is a matching cone which is made of a steel body and which further comprises a non-porous brass ring which is attached to the steel body.

12. A lubricated friction clutch for automotive transmissions according to claim 1 wherein the clutch is of the synchronization ring and matching cone type.

13. A lubricated friction clutch according to claim 1 wherein the second friction surface is surface hardened.

14. A process for manufacturing a lubricated friction clutch for automotive transmissions according to claim 1 comprising the steps of:
   providing a prepressed and preshaped powdered body;
   sintering the powdered body to form a sintered body which is porous, the body having a friction surface;
   hardening the friction surface after sintering by the step chosen from the group consisting of induction and case-hardening; and
   grinding the friction surface to the exact final dimension.

* * * * *

UNITED STATES PATENT AND TRADEMARK OFFICE
CERTIFICATE OF CORRECTION

PATENT NO. : 4,951,798

DATED : August 28, 1990

INVENTOR(S) : WALTER KNOESS

It is certified that error appears in the above-identified patent and that said Letters Patent is hereby corrected as shown below:

ON THE TITLE PAGE:

[56] References Cited U.S. Patent Documents
Line 5, "Mutz" should read --Putz--.

Column 4, Line 29, "transmission" should read --transmissions--.

Column 8, Line 40, (Claim 3), after "according" insert the word --to--.

Signed and Sealed this

Sixteenth Day of March, 1993

Attest:

STEPHEN G. KUNIN

*Attesting Officer*   *Acting Commissioner of Patents and Trademarks*